United States Patent [19]

Burrage

[11] Patent Number: 4,504,905
[45] Date of Patent: Mar. 12, 1985

[54] DIGITAL CONTROL SYSTEM INCLUDING MEANS FOR MAINTAINING SIGNALS SUPPLIED THEREBY WITHIN LIMITING VALUES

[75] Inventor: Robert G. Burrage, Solihull, England
[73] Assignee: Lucas Industries PLC, England
[21] Appl. No.: 412,106
[22] Filed: Aug. 27, 1982

[30] Foreign Application Priority Data

Sep. 5, 1981 [GB] United Kingdom ............... 8126926

[51] Int. Cl.³ ..................... G06F 11/20; G06F 15/16
[52] U.S. Cl. ................................. 364/200; 364/131; 364/551; 371/9
[58] Field of Search ... 364/131, 187, 551, 200 MS File, 364/900 MS File, 741; 371/9, 16, 68; 318/564, 563

[56] References Cited

U.S. PATENT DOCUMENTS

| | | | |
|---|---|---|---|
| 3,984,665 | 10/1976 | Shriver et al. | 364/187 |
| 4,029,952 | 6/1977 | Giras et al. | 364/187 |
| 4,032,757 | 6/1977 | Eccles | 371/9 |
| 4,057,715 | 11/1977 | Jones et al. | 364/187 |
| 4,059,745 | 11/1977 | Gaertner | 364/187 |
| 4,133,027 | 1/1979 | Hogan | 364/187 |
| 4,141,066 | 2/1979 | Keiles | 364/187 |
| 4,142,364 | 3/1979 | Wanger | 60/39.281 |
| 4,210,226 | 7/1980 | Ichioka | 371/9 |
| 4,251,873 | 2/1981 | Joby | 371/9 |
| 4,270,345 | 6/1981 | Kast | 60/39.281 |
| 4,377,000 | 3/1983 | Staab | 364/187 |
| 4,432,048 | 2/1984 | Ito et al. | 364/187 |

FOREIGN PATENT DOCUMENTS 2019622 7/1982 United Kingdom ............... 364/741

OTHER PUBLICATIONS

"Electronic Analog and Hybrid Computers", by Korn and Korn, McGraw-Hill, 1964, pp. 243-352, et seq. and FIG. 9-8.

Primary Examiner—James D. Thomas
Assistant Examiner—William G. Niessen
Attorney, Agent, or Firm—Andrus, Sceales, Starke & Sawall

[57] ABSTRACT

An apparatus, for example a gas turbine engine is normally controlled by a digital first computer which is responsive to engine operating conditions. A second computer is responsive to selected ones of said conditions. Control signals from the digital computer are monitored by a circuit which generates analog signals which lie within acceptable ranges and which correspond to the values generated by the digital computer. The monitor circuit supplies the engine with signals selected from whichever of the analog value and corresponding digital value lies farthest from a predetermined limit. Predetermined levels of discrepancy between any of the analog values and its corresponding digital value cause control of the engine to be transferred to the second computer, which may also be a digital computer.

5 Claims, 2 Drawing Figures

DIGITAL CONTROL SYSTEM INCLUDING MEANS FOR MAINTAINING SIGNALS SUPPLIED THEREBY WITHIN LIMITING VALUES

BACKGROUND OF THE INVENTION

This invention relates to control systems in which control is primarily or wholly effected by signals from digital computers. Such systems are commonly referred to as "full authority" digital control systems. In such control systems the control activity is commonly regulated by a digital computer which is itself responsive to sensed and/or desired operating conditions of an apparatus to be controlled. The number of these operating conditions may be large, and each of the individual conditions may fall within substantial ranges of values. The combinations and sequences of the operating values will then be very large indeed, so that it will not be possible to test the system over the whole of the combined operating conditions which it may encounter in use. The problem is increased by the relative ease with which a digital control system may be reprogrammed, so that extensive tests which may have been carried out with the system under control of a superseded programme will no longer be valid.

Inability to predict the response of a full authority system under all operating conditions has lead to reluctance on the part of authorities connected with air-worthiness to approve such system for use in an aircraft, particularly since an inappropriate response of the system to a combination of conditions, resulting for example from a programming fault, will not occur randomly but may, in that combination of conditions, cause malfunction of all apparatus controlled by the digital computer. It will be apparent moreover that duplication of identically programmed processors will not overcome this problem, since each malfunction simultaneously and in the same way. The present invention provides a full authority digital control system in which the foregoing problems are overcome.

SUMMARY OF THE INVENTION

According to the invention there is provided a full authority digital control system comprising an apparatus responsive to electrical input signals, a first, digital, computer responsive to a plurality of operating conditions of said apparatus for generating first digital control signals, a second computer responsive to at least some of said operating conditions for generating second control signals, means for deriving said input signals from said first or said second control signals, a monitoring circuit responsive to at least some of said operating conditions and to said first control signals for determining acceptable values of said first control signals and for causing said input signals to be derived only from those of said first control signals whose values lie within the range of said acceptable values, and switching means operable in one of its states to cause said input signals to be derived from said first control signals, and including means responsive to a predetermined difference between any of said first control signals and its corresponding acceptable value, for isolating said apparatus from said first control signals and for causing said input signals to be derived from said second control signals.

BRIEF DESCRIPTION OF THE DRAWINGS

An embodiment of the invention will now be described by way of example only, and with reference to the accompanying drawings in which.

DESCRIPTION OF THE PREFERRED EMBODIMENT

Figure 1:
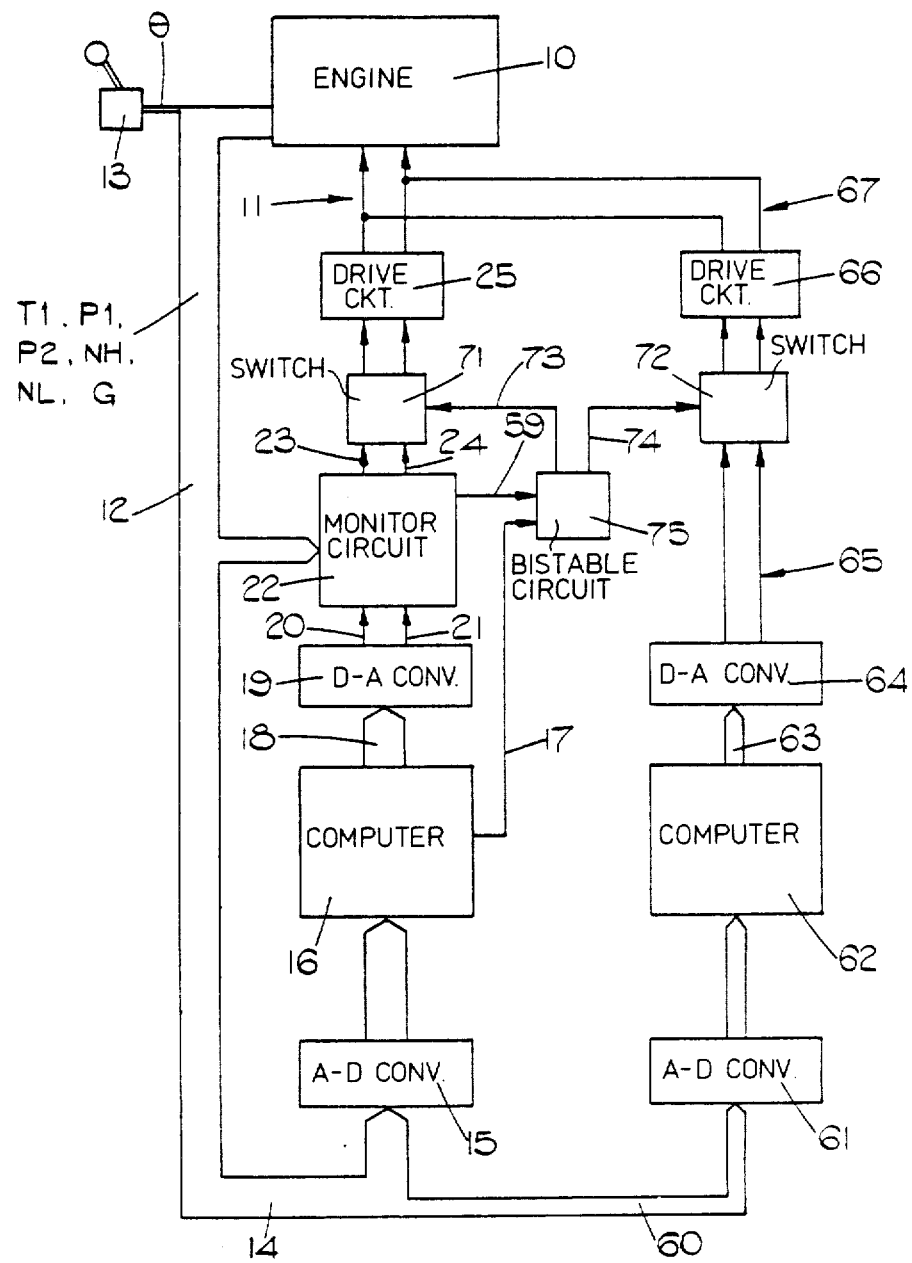
FIG. 1 is a block diagram of a full authority digital control system applied to a gas turbine.

A gas turbine engine 10 is responsive to analog electrical input signals on a plurality of lines 11, these signals corresponding to the required position of a fuel metering valve in the engine 10 and to requirements for variation of the engine geometry, such as the operating position of compressor guide vanes. Sensed conditions of the engine 10, for example the aforesaid engine geometry G, the speeds NH,NL of high pressure and low pressure shafts, compressor pressure P1,P2 and engine intake temperature T1 are supplied on a plurality of lines 12. The signals on the lines 12 from the engine are combined with a signal $\theta$ corresponding to the operating position of an engine speed selector device 13, to provide analog engine operating condition signals on lines 14. The signals on lines 14 are supplied to circuit 15 one of whose functions is to convert the analog signals on the lines 14 to digital signals for supply to a first digital computing arrangement 16. The computing arrangement 16 comprises two identical digital computers of the type available under the designation Z8002 from ZILOG Inc., of Cupertino, Calif., U.S.A. The two computers are each responsive to signals from the circuit 15 and are connected for bit-by-bit checking of their outputs, in a manner described in U.S. Pat. No. 4,251,873. In the event that a difference between the outputs of the computers in the arrangement 16 persists for more than a predetermined time a signal is provided on a line 17 to a switching arrangement, later to be described. The output from one of the computers in the arrangement 16 is provided on lines 18 to a digital to analog converter 19 and thence on lines 20,21 to a monitoring circuit 22.

The circuit 22 is responsive to the operating signals on the lines 12 and provides analog control signals on lines 23, 24 in response to the signals on lines 12 and 20,21. Drive circuits 25 are responsive to the signals on the lines 23, 24 to provide the input signals on the lines 11 to the engine 10.

Figure 2:
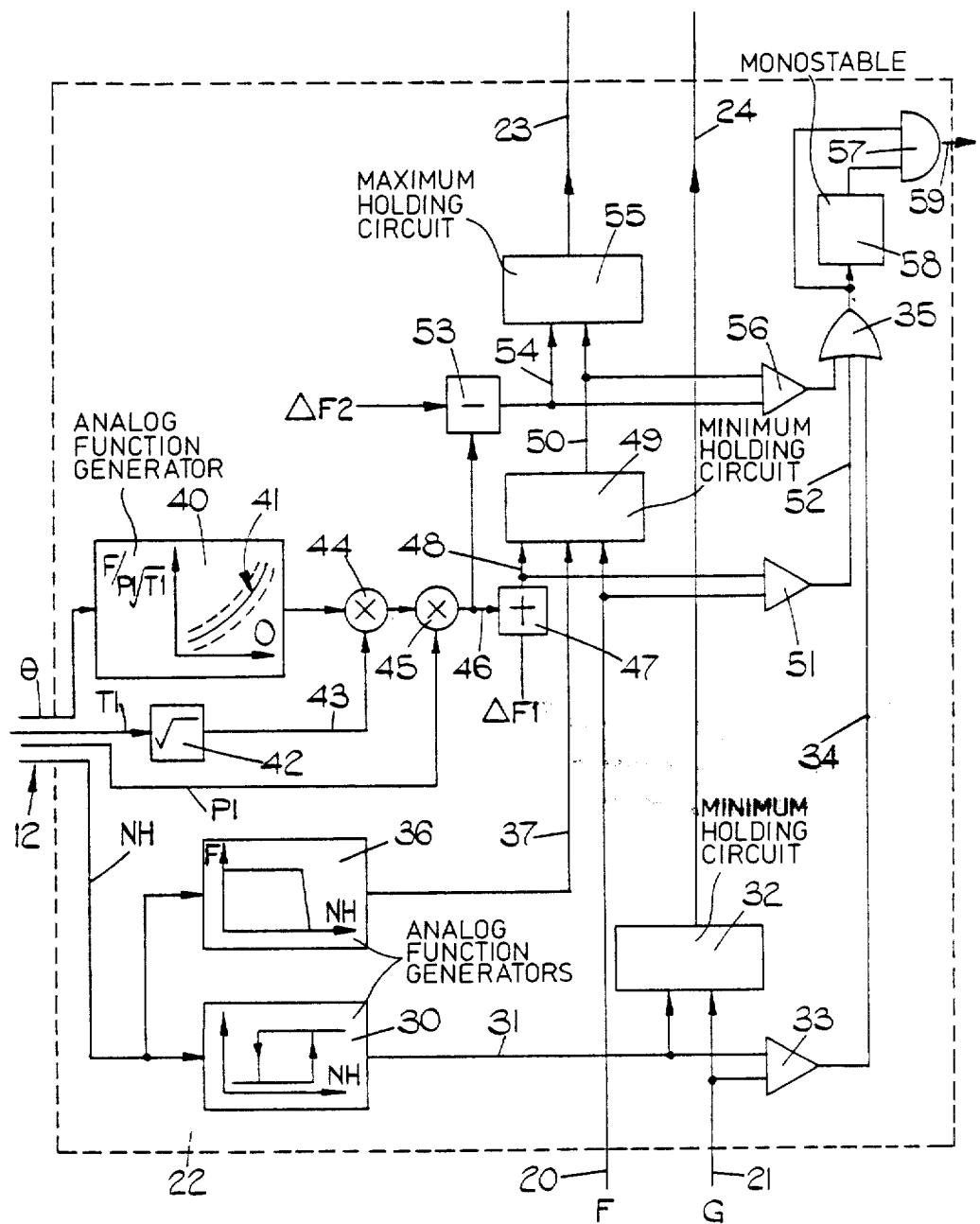
FIG. 2 is a diagram of a monitoring circuit forming part of the system of FIG. 1.

As shown in FIG. 2, the circuit 22 is responsive to the speed NH of the engine high pressure shaft, to the pressure P1 and temperature T1 at the engine air intake and to the position $\theta$ of the engine speed selector 13. The circuit 22 is also responsive to analog signals on the lines 20,21 these signals corresponding respectively to desired fuel flow F and to the required angular positions G of the engine inlet guide vanes. An analog function generating circuit 30 is responsive to the speed signal NH and provides on a line 31, a signal corresponding to the required inlet guide vane position, and this signal is applied, together with the required position signal G on the line 21, to a minimum-holding circuit 32, so that the signal on line 24 cannot exceed that generated by the circuit 30. The signals on lines 21,31 are also applied to a comparator 33 which provides a signal on a line 34 to one input of an OR gate 35 if a difference between the signals on lines 21, 31 exceed a predetermined value.

The NH signal is also applied to a further function generating circuit 36 which provides an analog output signal on a line 37, this signal having the characteristic indicated in the element 36 and providing an upper limit of required fuel flow F for values of the speed NH. It will be noted that the value of F decreases sharply at a predetermined value of NH, and the signal on line 37 thus specifies fuel flow which sets an upper limit on the speed NH.

A further analog circuit 40 is responsive to the signal $\theta$ to generate a signal corresponding to $F/P1\sqrt{T1}$, which has the characteristic 41 indicated by the solid line curve in the element 40. The characteristic 40 corresponds to a steady-running value of fuel flow. Above and below the characteristic 41 are curves representing permissible maximum and minimum boundaries of fuel flow for acceleration and deceleration respectively. If it is convenient to consider the acceleration curve as having a constant value $\Delta F1$ above the curve 41, and the deceleration curve as having a constant value $\Delta F2$ below the curve 41.

A circuit 42 generates, on a line 43, a signal corresponding to the square root of the value T1. The signal from the circuit 40 is applied, together with the signal on line 43, to a multiplying circuit 44 and the resulting product is multiplied by the P1 signal in a further multiplying circuit 45. The resulting signal on line 46 corresponds to the desired fuel flow F for steady running of the engine 10 and for a given setting $\theta$. A constant value, corresponding to the aforesaid acceleration increment $\Delta F1$, is added by means of a circuit 47 and the sum is applied on a line 48 to a minimum-holding circuit 49. The fuel demand signals on lines 20 and 37 are also applied to the lowest wins circuit 49. The fuel demand signal on a line 50 from the circuit 49 thus cannot exceed the value set by the acceleration curve indicated in circuit 40, or the NH limiting value set by the circuit 36, whichever is the lower. The signals on lines 20,48 are supplied to a comparator 51 which provides a signal on a line 52 to the OR gate 35 if the difference between the signals on lines 20,48 exceeds a predetermined level.

A subtracting circuit 53 is responsive to the signal on line 46 and to a constant value which corresponds to the aforesaid deceleration decrement $\Delta F2$. The output signal from the circuit 53 is applied on a line 54 to a maximum-holding circuit 55 to which the signal on line 50 is also applied. The output signal on line 23 from the circuit 55 thus cannot be less than the value set by the deceleration curve shown in circuit 40. The combined effect of the circuits 49, 55 and of their input signals is that the fuel demand signal on line 23 will lie between the acceleration and deceleration boundaries indicated in the circuit element 40, subject to the speed restriction imposed by the circuit 36, even if the signals from the computer arrangement 16 correspond to a fuel demand which is outside the aforesaid boundaries.

The signals on lines 50, 54 are supplied to a comparator 56 which provides an output signal to the OR gate 35 if a difference between the signals on lines 50,54 exceeds a predetermined level. The output of the OR gate 35 is connected to one input of an AND gate 57 and also to the trigger connection of a monostable circuit 58 whose output is connected to the other input of the AND gate 57. The monostable circuit provides an output signal which is delayed by a predetermined amount from the onset of the signal from the OR gate 35. The AND gate 57 will thus provide an output signal on a line 59 only when a predetermined difference between the input signals to any of the circuits 32, 49,55 has persisted for the delay time of the monostable circuit 58.

Selected ones of the signals on lines 14 are supplied by lines 60 to an analog to digital converter circuit 61 which provides digital input signals to a self-monitoring digital computer 62 which is of the type available under the designation 9900 from Texas Instruments. The selected signals on the lines 60 are the minimum necessary to enable the computer 62 to effect safe control of the engine 10, even though this control may not provide optimum operating conditions. Digital output signals from the computer 62 are provided on lines 63 to a digital to analogue converter 64 and can be supplied from the converter 64 on lines 65 to a drive circuit 66, corresponding generally to the drive circuit 25. The drive circuit 66 can thus provide, on lines 67, control signals for the engine 10. The lines 67 are connected to those of the lines 11 which in normal use carry corresponding signals.

Switch devices 71,72 are responsive to signals on respective lines 73,74 from a bistable circuit 75. Switch device 71 controls application of the signals on lines 23, 24 to the drive circuit 25. Switch device 72 controls application of the signals on lines 65 to the drive circuit 66. In its first, normal state the bistable circuit 75 supplies a signal on line 71 to enable the switch device 71 to pass the signals on lines 23, 24. In this state of the circuit 75 the switch device 72 is not enabled. The circuit 75 changes state in response to a signal on either of the lines 17,59, thereby disenabling the switch device 71 and enabling the switch device 72. Thus, in response to malfunction of the computer arrangement 17 or detection by the monitoring circuit 22 of a predetermined and persisting discrepancy between the control signals, control of the engine 10 is shifted to the computer 62.

In a preferred embodiment the circuits 30,36 (FIG. 2) are arranged to generate signals whose limiting values are somewhat higher than those of the corresponding signals on lines 20,21, and thereby to ensure that an error signal is not inadvertently transmitted on the line 59. Similarly the values of $\Delta F1$ and $\Delta F2$ are arranged to set limits to the acceleration and deceleration boundaries which are respectively slightly higher and lower than those for which the computers in the arrangement 16 will generate, for a corresponding engine operation condition.

I claim:

1. A full-authority digital control system comprising an apparatus responsive to electrical input signals, a first digital computer responsive to a plurality of operating conditions of said apparatus for generating first digital control signals, a second computer responsive to at least some of said operating conditons for generating second control signals, switching means for deriving said input signals either from said first or from said second control signals, and a monitoring circuit including means responsive to at least some of said operating conditions for generating limiting values of said first control signals, said monitoring circuit also including means for deriving said input signals only from those of said first control signals which are within said limiting values, said switching means being responsive to excursions for more than a predetermined time of any of said first control signals beyond a limiting value thereof, for isolating said apparatus from said first control signals and for causing said input signals to be derived from said second control signals.

2. A full-authority digital control system comprising an apparatus reponsive to electrical input signals, a first digital computer responsive to a plurality of operating conditions of said apparatus for generating first digital control signals, a second computer responsive to at least some of said operating conditions for generating second control signals, means for deriving said input signals either from said first or from said second control signals, a monitoring circuit including a plurality of means for generating first analog signals which are functions of selected ones of said operating conditions and which represent limiting values of one of said control signals, and a plurality of discriminator circuits each of which is responsive to one of said first analog signals and to a signal derived from a corresponding one of said first control signals, each said discriminator circuits being operable to derive respective ones of said input signals from whichever of its analog and control signals has the greater difference from a predetermined limiting value, said monitoring circuit also including means for deriving said input signals only from those of said first control signals which are within said limiting values, and means responsive to excursions for more than a predetermined time of any of said first control signals beyond a limiting value thereof, for isolating said apparatus from said first control signals and for causing said input signals to be derived from said second control signals.

3. A system as claimed in claim 2 in which said monitoring circuit includes means for generating a second analog signal corresponding to a predetermined upper limit of one of said input signals, one of said discriminator circuits being responsive to said second analog signal, to an upper limiting value of one of said first analog signals and to a corresponding one of said first control signals, said one discriminator circuit including means for providing an output signal corresponding to the lowest of the three signals to which it is responsive.

4. A system as claimed in claim 1, 2 or 3, in which said first computer comprises two digital computing devices and means for comparing the output signals from said devices on a bit-by-bit basis.

5. A system as claimed in claim 1 or 2 in which said second computer is a digital computer.

* * * * *